United States Patent
Yu et al.

(10) Patent No.: US 9,877,183 B2
(45) Date of Patent: Jan. 23, 2018

(54) TERMINAL AND PROCESSING METHOD FOR HEAD PORTRAIT OF CONTACT PERSON

(71) Applicants: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

(72) Inventors: Huijuan Yu, Guangdong (CN); Xiaodan Wang, Guangdong (CN)

(73) Assignees: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

( * ) Notice: Subject to any disclaimer, the term of this patent is extended or adjusted under 35 U.S.C. 154(b) by 0 days.

(21) Appl. No.: 14/888,584

(22) PCT Filed: May 2, 2013

(86) PCT No.: PCT/CN2013/075078
§ 371 (c)(1),
(2) Date: Nov. 2, 2015

(87) PCT Pub. No.: WO2014/176773
PCT Pub. Date: Nov. 6, 2014

(65) Prior Publication Data
US 2016/0080934 A1    Mar. 17, 2016

(51) Int. Cl.
*H04M 3/00* (2006.01)
*H04W 8/18* (2009.01)
(Continued)

(52) U.S. Cl.
CPC ........ *H04W 8/183* (2013.01); *G06F 17/3028* (2013.01); *G06F 17/3048* (2013.01);
(Continued)

(58) Field of Classification Search
CPC ........... G06F 17/30268; G06F 17/3028; G06F 17/30345; G06F 17/3048; H04M 1/27455; H04W 4/003; H04W 8/183
See application file for complete search history.

(56) References Cited

U.S. PATENT DOCUMENTS

| | | | |
|---|---|---|---|
| 8,407,599 B1 | 3/2013 | Klein et al. | |
| 2011/0107228 A1* | 5/2011 | Huang | G06Q 10/10 715/739 |
| 2011/0197163 A1* | 8/2011 | Jegal | G06F 3/0482 715/811 |
| 2012/0119987 A1* | 5/2012 | Im | G06F 3/017 345/156 |

(Continued)

FOREIGN PATENT DOCUMENTS

| | | |
|---|---|---|
| CN | 101916271 A | 12/2010 |
| CN | 102104650 A | 6/2011 |

(Continued)

OTHER PUBLICATIONS

International Search Report dated Feb. 20, 2014 received from International Application No. PCT/CN2013/075078.
(Continued)

*Primary Examiner* — Timothy Pham
(74) *Attorney, Agent, or Firm* — Scully, Scott, Murphy & Presser, P.C.

(57) ABSTRACT

The present invention provides a terminal which includes a program determining unit configured to determine at least one associated application program corresponding to a designated contact person in an address book of the terminal, and a displaying unit configured to simultaneously display head portraits of the designated contact person in the address book and the at least one associated application program under the condition that the address book or a designated
(Continued)

interface provided by any of the at least one associated application program is displayed. The present invention further provides a processing method for head portraits of a contact person.

12 Claims, 10 Drawing Sheets

(51) Int. Cl.
*H04M 1/2745* (2006.01)
*G06F 17/30* (2006.01)
*H04W 4/00* (2009.01)

(52) U.S. Cl.
CPC .. *G06F 17/30268* (2013.01); *G06F 17/30345* (2013.01); *H04M 1/27455* (2013.01); *H04W 4/003* (2013.01)

(56) References Cited

U.S. PATENT DOCUMENTS

2013/0082956 A1* 4/2013 Yajima ............... G06F 1/1626
345/173

FOREIGN PATENT DOCUMENTS

| CN | 102143485 A | 8/2011 |
| CN | 102215302 A | 10/2011 |
| CN | 102984181 A | 3/2013 |

OTHER PUBLICATIONS

Chinese First Office Action received in related CN 201380062725.7 dated Oct. 20, 2016, English translation only.
Extended European Search Report received in related PCT/CN2013075078 dated Dec. 21, 2016.

* cited by examiner

TERMINAL AND PROCESSING METHOD FOR HEAD PORTRAIT OF CONTACT PERSON

FIELD OF THE TECHNICAL

The present disclosure relates to mobile technology field, and particularly to a terminal and a processing method for head portraits of a contact person.

BACKGROUND

In the existing technology, when a user uses an address book of a terminal or a social application, only images in the local album can be set to be head portraits of contact persons, or only the head portraits used by the current application can be looked up and the head portraits used by other applications cannot be looked up. Furthermore, the head portraits of contact persons in various social application programs installed in the mobile phone cannot be set to be associated with the head portraits of the contact persons in the address book, and to a great extend selectivity and manipulability cannot satisfy user's needs.

Therefore, the present invention provides a technical solution. By means of the technical solution, when the user performs an operation to set the head portrait of a designated contact person in the address book or in an application program, the head portraits of the contact person in application programs and the address book can be collected and displayed for the user to make a selection, thereby increasing user's selectivity and improving user's experience.

SUMMARY

Based on the problems set forth above, the present invention provides a technical solution. By means of the technical solution, when the user performs an operation to set the head portrait of a designated contact person in the address book or in an application program, the head portraits of the contact person in application programs and the address book can be collected and displayed for the user to make a selection, thereby increasing user's selectivity and improving user's experience.

The present invention provides a terminal includes a program determining unit configured to determine at least one associated application program corresponding to a designated contact person in an address book of the terminal, and a displaying unit configured to simultaneously display head portraits of the designated contact person in the address book and in the at least one associated application program under the condition that the address book or a designated interface provided by any of the at least one associated application program is displayed.

In the technical solution, by simultaneously displaying head portraits of the same contact person in the address book and other application programs, it facilitates the user to perform an operation to look up and update the head portraits, and repeated switch among different application programs or interfaces can be avoided, thereby simplifying user's operation. Specific information of contact persons is stored in the address book and other application programs, thus application programs associated with the designated contact person in the address book can be found according to information matching.

In the technical solution, preferably, the program determining unit is further configured to determine a designated application program as one associated application program of the designated contact person under the condition that the designated application program includes contact person information which matches information of the designated contact person, or under the condition that the information of the designated contact person includes account information of the designated application program.

In the technical solution, by determining the associated application program corresponding to the designated contact person, the head portraits of the contact person in various application programs can be conveniently displayed for the user to make a selection when the user performs an operation to set the head portrait of the contact person. Specifically, when the user performs an operation to store a contact person in the address book of the terminal, account information of the contact person in some application programs may be also stored, such as a Sina micro blog account, a QQ account, and so on, and accordingly it can be determined that the application programs associated with the contact person at least include Sina micro blog, QQ, and so on. Personal information of a contact person in an application program may include a mobile phone number of the contact person. Therefore, if the mobile phone number in personal information of the designated contact person in a certain application program matches the mobile phone number of a certain contact person in the address book, it can be determined that the application program is an associated application program of the contact person.

In the technical solution, preferably, the designated interface is a head portrait setting interface or a head portrait look-up interface provided by the application program corresponding to the designated interface.

In the technical solution, when the user performs an operation to set or look up the head portrait of the designated contact person in the address book of the terminal or in an application program, all head portrait information of the designated contact person in the corresponding application programs is displayed, thus the user can directly perform an operation to look up or set the head portrait without opening a various of application programs, which simplifies user's operation, enhances user's intuitive sense, and is beneficial for the user to make a selection. Also, for the setting of a head portrait, in the address book of the terminal, the head portrait of the owner or head portraits of other contact persons can be set randomly. In a third-party application program, besides the setting of the head portrait of the user (the user logs in to the third-part application program via an account and a password), head portraits of contact persons of the user in the third-party application program can also be set. Wherein, the setting of the head portrait of a contact person may be determined to be a remark for the contact person, and may not be able to change the head portrait actually used by the contact person (that is, when the contact person logs in to the same application program, the head portrait in its interface may not be changed). For example, in QQ, a certain contact person sets the head portrait of himself/herself to be a comic strip, and often changes his/her username. To avoid getting the wrong person, a true person's head can be set to be a remark. Thus, even if the contact person sets a new head portrait for himself/herself, the contact person can be recognized.

In the technical solution, preferably, the terminal further includes a head portrait selecting unit configured to select one head portrait from at least one head portrait displayed in the designated interface according to a received head portrait selection command, and a head portrait setting unit configured to set the selected head portrait to be the head portrait of the designated contact person in the application program corresponding to the designated interface, or to be the head portraits of the designated contact person in the address book and in the at least one associated application program corresponding to the designated contact person.

In the technical solution, by selecting one head portrait from the displayed head portraits, the user does not need to look up various application programs, and furthermore the user does not need to perform a manual operation to download a head portrait which needs to be set, thus user's operation is simplified, and also to a certain extend the association among a specific contact person and various application programs corresponding to the specific contact person can be enhanced. Specifically, when the user performs an operation to set a head portrait of a contact person in a specific application program, e.g., Sina micro blog, the head portrait of the contact person in the address book of the terminal and the head portraits of the contact person in all the corresponding application programs can be set to be the same, thereby facilitating the user to recognize the same contact person in different application programs. Certainly, the user can only set the selected head portrait to be the head portrait of the contact person in Sina micro blog, and in other application programs and the address book the head portraits of the contact person are set to be different.

In the technical solution, preferably, the terminal further includes a local head portrait database establishing unit configured to establish a local head portrait database in the terminal, acquire the head portraits of the designated contact person in the address book and the at least one associated application program, and store the designated contact person and the corresponding head portraits in the local head portrait database in a related manner. Wherein, under the condition that the head portraits of the designated contact person in the designated interface need to be displayed, the displaying unit acquires the corresponding head portraits from the local head portrait database and displays the acquired head portraits.

In the technical solution, by establishing the local head portrait database, when the user performs an operation to set the head portrait of a specific contact person, the local head portrait database is searched and each time it does not need to search all file folders in the terminal, thus user's waiting time is reduced, and furthermore it does not need to acquire head portraits from a network, thereby enhancing manipulability of the technical solution. Specifically, different storage directories corresponding to each contact person can be established in the local head portrait database. When setting or looking up the head portrait of a specific contact person, it only needs to search the storage directories corresponding to the specific contact person, and the found storage directories are displayed for the user to make a selection, which is beneficial for reducing response time.

In the above-mentioned technical solution, preferably, the local head portrait database establishing unit includes an address book data invoking sub-unit configured to invoke contact person information in the address book and acquire the head portrait information of the designated contact person when it needs to acquire the head portrait of the designated contact person in the address book. The local head portrait database establishing unit further includes a sever data acquiring sub-unit or a caching data acquiring sub-unit. Wherein, the server data acquiring sub-unit is configured to acquire the head portrait of the designated contact person from at least one server each corresponding to one of the at least one associated application program when it needs to acquire the head portrait of the designated contact person in the at least one associated application program. The caching data acquiring sub-unit is configured to acquire the head portrait of the designated contact person from at least one local caching file in the terminal each corresponding to one of the at least one associated application program when it needs to acquire the head portrait of the designated contact person in the at least one associated application program.

In the technical solution, in the address book of the terminal the head portrait of the designated contact person is included in the personal information of the designated contact person. By invoking the personal information of the designated contact person, the head portrait information of the designated contact person can be conveniently extracted. When the user performs an operation to look up the head portrait of the contact person in a third-party application program, in one case, the head portrait can be acquired from a local caching file without connecting to a network, thereby reducing the demand for a network. In another case, if the user hopes to look up the latest head portrait of the contact person, as the head portrait of the contact person is set and managed by himself/herself, it needs to acquire the latest head portrait from the server corresponding to the application program, thus the head portrait information of the contact person can be updated in time.

In the above-mentioned technical solution, preferably, the displaying unit is further configured to display the head portrait of the designated contact person in an address book of a terminal of at least one other contact person in the designated interface, wherein the at least one other contact person is the contact person in the address book of the terminal of the designated contact person or the at least one associated application program.

In the technical solution, the information of the same contact person can be stored in terminals of different users, and some user can perform an operation to acquire the head portraits of the designated contact person set by other users, and the selectivity of setting a head portrait by the user increases.

In the above-described technical solution, preferably, a network head portrait database corresponding to the terminal is established in a designated server. When when at least one contact person and the head portrait of the at least one contact person in an address book of a terminal of at least one other contact person are stored in a related manner in the network head portrait database and the at least one other contact person is the contact person in the address book of the terminal of the at least one contact person or the at least one associated application program, the terminal further includes a data interaction unit configured to acquire the head portraits of the designated contact person from the network head portrait database when the head portraits of the designated contact person in the designated interface need to be displayed, and the displaying unit displays the acquired head portraits.

In the technical solution, by establishing the network head portrait database, when the user performs an operation to set the head portrait of a specific contact person, the server can directly search the corresponding network head portrait database, thereby saving the storage space of the terminal, and search operation can be handed over to the server to reduce requirements for operation ability of the terminal, to fully use powerful operation and search ability of the server, and to reduce response time for user's request.

In the technical solution, preferably, the data interaction unit is further configured to upload at least one contact person and the head portrait of the at least one contact person in the address book to the network head portrait database in a related manner.

In the technical solution, by uploading the head portrait of the designated contact person in the address book of the designated terminal to the network head portrait database, when the other user performs an operation to set the portrait head of the designated contact person, the head portrait information in the address book of the designated terminal can be found. If more and more terminals upload contact person information in their address books to the server, it is more beneficial to collect and analyze data, and accordingly the selectivity for setting a head portrait increases.

In the technical solution, preferably, the data interaction unit is further configured to transmit a request for acquiring head portraits to the designated server, so as to acquire the head portrait of the designated contact person from at least one other terminal's network head portrait database in the designated server and add the acquired head portrait to the network head portrait database corresponding to the terminal. Wherein, the at least one other terminal is the terminal of at least one contact person who is the contact person in the address book of the terminal of the designated contact person or the at least one associated application program.

In the technical solution, all terminals upload contact person information in their address books to the server, so as to establish network head portrait libraries each corresponding to one terminal. When a certain terminal issues a request for head portraits of a certain contact person, according to the information of the contact person, such as the name, the mobile phone number, the account used in a third-party application program, and so on, different network head portrait libraries are searched to find the contact person, and the head portraits of the contact person in the different network head portrait libraries are extracted, so as to respond to the request issued by the terminal. Certainly, users of different terminals having the same contact person therein may be unfamiliar to each other, thus, the server can be configured to push head portraits of the requested contact person in all the terminals no matter whether or not the users of the terminals are familiar to each other, or configured to determine the users who know the user of the terminal issuing the request among the users of the terminals each having the head portrait of the requested contact person therein, and only push the head portraits of the requested contact person in the terminals of the determined users (specifically, for the terminal A and the terminal B, if the address book of the terminal A has the contact information of the user of the terminal B or if the address book of the terminal B has the contact information of the user of the terminal A, or if the address book of the terminal A has the contact information of the user of the terminal B and the address book of the terminal B has the contact information of the user of the terminal A, the users of the terminal A and the terminal B are determined to be familiar to each other). By acquiring more head portrait information of the same contact person, the selectivity of the user increases.

In the technical solution, preferably, the terminal further includes an association setting unit configured to establish an association between each head portrait of the designated contact person in the designated interface and the source program corresponding to the head portrait. The terminal further includes a message processing unit or an interface switching unit. Wherein, the message processing unit is configured to display messages generated by the source program corresponding to the designated head portrait of the designated contact person in the designated interface according to a received selection operation exerted on the designated head portrait. The interface switching unit is configured to directly switch to a function interface provided by the source program corresponding to the designated head portrait according to a received selection operation exerted on the designated head portrait.

In the technical solution, by associating each head portrait of the designated contact person with an application program, through a contact person interface provided by a certain application program, messages generated by other application programs can be looked up directly and in time via the head portraits of the contact person. For example, beside one head portrait, a bubble box for displaying QQ chat messages of a user or update information of micro blog is displayed, or various application programs can be switched via the head portraits of the contact person, thereby facilitating the user to perform an operation.

The present invention further provides a processing method for portrait heads of a contact person. The method includes determining at least one associated application program corresponding to a designated contact person in an address book of the terminal, and displaying head portraits of the designated contact person in the address book and the at least one associated application program simultaneously when the address book or a designated interface provided by any of the at least one associated application program is displayed.

In the technical solution, by simultaneously displaying head portraits of the same contact person in the address book and other application programs, it facilitates the user to perform an operation to look up and update the head portraits, and repeated switch among different application programs or interfaces can be avoided, thereby simplifying user's operation. Specific information of contact persons is stored in the address book and other application programs, thus application programs associated with the designated contact person in the address book can be found according to information matching.

In the technical solution, preferably, the step of determining the at least one associated application program corresponding to the designated contact person includes determining a designated application program as one associated application program of the designated contact person if the designated application program includes contact information which matches information of the designated contact person, or the information of the designated contact person includes account information of the designated application program.

In the technical solution, by determining the associated application program corresponding to the designated contact person, the head portraits of the contact person in various application programs can be conveniently displayed for the user to make a selection when the user performs an operation to set the head portrait of the contact person. Specifically, when the user performs an operation to store a contact person in the address book of the terminal, account information of the contact person in some application programs may be also stored, such as a Sina micro blog account, a QQ account, and so on, and accordingly it can be determined that the application programs associated with the contact person at least include Sina micro blog, QQ, and so on. Personal information of a contact person in an application program may include a mobile phone number of the contact person. Therefore, if the mobile phone number in personal information of the designated contact person in a certain application program matches the mobile phone number of a certain contact person in the address book, it can be determined that the application program is the associated application program of the contact person.

In the technical solution, preferably, the designated interface is a head portrait setting interface or a head portrait look-up interface provided by the application program corresponding to the designated interface.

In the technical solution, when the user performs an operation to set or look up the head portrait of the designated contact person in the address book of the terminal or in an application program, all head portrait information of the designated contact person in the corresponding application programs is displayed, thus the user can directly perform an operation to look up or set the head portrait without opening a various of application programs, which simplifies user's operation, enhances user's intuitive sense, and is beneficial for the user to make a selection. Also, for the setting of a head portrait, in the address book of the terminal, the head portrait of the owner or head portraits of other contact persons can be set randomly. In a third-party application program, besides the setting of the head portrait of the user (the user logs in to the third-part application program via an account and a password), head portraits of contact persons in the third-party application program can also be set. Wherein, the setting of the head portrait of a contact person may be determined to be a remark for the contact person, and may not be able to change the head portrait actually used by the contact person (that is, when the contact person logs in to the same application program, the head portrait in its interface may not be changed). For example, in QQ, a certain contact person sets the head portrait of himself/herself to be a comic strip, and often changes his/her username. To avoid getting the wrong person, a true person's head can be set to be a remark. Thus, even if the contact person sets a new head portrait for himself/herself, the contact person can be recognized.

In the technical solution, preferably, the method further includes selecting one head portrait from at least one head portrait displayed in the designated interface according to a received head portrait selection command. Wherein, the selected head portrait is set to be the head portrait of the designated contact person in the application program corresponding to the designated interface, or to be the head portraits of the designated contact person in the address book and in the at least one associated application programs corresponding to the designated contact person.

In the technical solution, by selecting one head portrait from the displayed head portraits, the user does not need to perform an operation to look up various application programs, and furthermore the user does not need to perform a manual operation to download a head portrait which needs to be set, thus user's operation is simplified, and also to a certain extend the association among a specific contact person and various application programs corresponding to the specific contact person can be enhanced. Specifically, when the user performs an operation to set a head portrait of a contact person in a specific application program, e.g., Sina micro blog, the head portrait of the contact person in the address book of the terminal and the head portraits of the contact person in all the corresponding application programs can be set to be the same, thereby facilitating the user to recognize the same contact person in different application programs. Certainly, the user can only set the selected head portrait to be the head portrait of the contact person in Sina micro blog, and in other application programs and in the address book the head portraits of the contact person are set to be different.

In the technical solution, preferably, the method further includes establishing a local head portrait database in the terminal, obtaining the head portraits of the designated contact person in the address book and the at least one associated application program, and storing the designated contact person and the corresponding head portraits in the local head portrait database in a related manner. Wherein, when the head portraits of the designated contact person in the designated interface need to be displayed, the corresponding head portraits are acquired from the local head portrait database and displayed.

In the technical solution, by establishing the local head portrait database, when the user sets the head portrait of a specific contact person, the local head portrait database is searched and each time it does not need to search all file folders in the terminal, thus user's waiting time is reduced, and furthermore it does not need to acquire head portraits from a network, thereby enhancing manipulability of the technical solution. Specifically, different storage directories corresponding to each contact person can be established in the local head portrait database. When setting or looking up the head portrait of a specific contact person, it only needs to search the storage directories corresponding to the specific contact person, and the found storage directories are then displayed for the user to make a selection, which is beneficial for decreasing response time.

In the above-mentioned technical solution, preferably, the step of acquiring the head portrait of the designated contact person in the address book includes invoking contact person information in the address book and acquiring the head portrait information of the designated contact person. The step of acquiring the head portrait of the designated contact person in the at least one association application program includes acquiring the head portrait of the designated contact person from at least one server each corresponding to one of the at least one associated application program, or acquiring the head portrait of the designated contact person from at least one local caching file in the terminal each corresponding to one of the at least one associated application program.

In the technical solution, in the address book of the terminal the head portrait of the designated contact person is included in the personal information of the designated contact person. By invoking the personal information of the designated contact person, the head portrait information of the designated contact person can be conveniently extracted. When the user performs an operation to look up the head portrait of a contact person in a third-party application program, in one case, the head portrait can be acquired from a local caching file without connecting to a network, which reduces the demand for a network. In another case, if the user hopes to look up the latest head portrait of the contact person, as the head portrait of the contact person is set and managed by himself/herself, it needs to acquire the latest head portrait from the server corresponding to the application program, thus the head portrait information of the contact person can be updated in time.

The present invention further provides a processing method for head portraits of a contact person. The processing method includes determining at least one associated application program corresponding to a designated contact person in an address book of the terminal, and if the head portraits of the designated contact person in the address book and in a designated interface of the at least one associated application program are different, setting the head portrait of the designated contact person in the address book to be the head portrait of the designated contact person in the designated interface of the associated application program, or setting the head portrait of the designated contact person in the designated interface of the associated application program to be the head portrait of the designated contact person in the address book. In the technical solution, the head portraits of the same contact person in the address book and the associated application program are compared, and the head portraits can be directly modified if they are not the same. The modification includes setting the head portrait in one party to be the head portrait in another party, or switching the head portraits between two parties.

In the above-described technical solution, preferably, the processing method further includes displaying the head portrait of the designated contact person in an address book of a terminal of at least one other contact person in the designated interface, wherein the at least one other contact person is the contact person in the address book of the terminal of the designated contact person or the at least one associated application program.

In the technical solution, the information of the same contact person can be stored in terminals of different users, and some user can perform an operation to acquire the head portraits of the designated contact person set by other users, and the selectivity of setting a head portrait by the user increases.

In the above-described technical solution, preferably, a network head portrait database corresponding to the terminal is established in a designated server. When when at least one contact person and the head portrait of the at least one contact person in an address book of a terminal of at least one other contact person are stored in a related manner in the network head portrait database and the at least one other contact person is the contact person in the address book of the terminal of the at least one contact person or the at least one associated application program, the processing method further includes acquiring the head portraits of the designated contact person from the network head portrait database when the head portraits of the designated contact person in the designated interface need to be displayed, and displaying the acquired head portraits.

In the technical solution, by establishing the network head portrait database, when the user performs an operation to set the head portrait of a specific contact person, the server can directly search the network head portrait database, thereby saving the storage space of the terminal, and search operation can be handed over to the server to reduce requirements for operation ability of the terminal, to fully use powerful operation and search ability of the server, and to reduce response time for user's request.

In the technical solution, preferably, the processing method further includes uploading at least one contact person and the head portrait of the at least one contact person in the address book to the network head portrait database in a related manner.

In the technical solution, by uploading the head portrait of the designated contact person in the address book of the designated terminal to the network head portrait database, when the other user performs an operation to set the head portrait of the designated contact person, the head portrait information in the address book of the designated terminal can be found. If more and more terminals upload contact person information in their address books to the server, it is more beneficial to collect and analyze data, and accordingly the selectivity for setting a head portrait increases.

In the technical solution, preferably, the processing method further includes transmitting a request for acquiring a head portrait to the designated server, so as to acquire the head portrait of the designated contact person from at least one other terminal's network head portrait database in the designated server and adding the acquired head portrait to the network head portrait database corresponding to the terminal of the designated contact person. Wherein, the at least one other terminal is the terminal of at least one contact person who is the contact person in the address book of the terminal of the designated contact person or the at least one associated application program.

In the technical solution, all terminals upload contact information in their address books to the server, so as to establish network head portrait libraries each corresponding to one terminal. When a certain terminal issues a request for head portraits of a certain contact person, according to the information of the contact person, such as the name, the mobile phone number, the account used in a third-party application program, and so on, different network head portrait libraries are searched to find the contact person, and the head portraits of the contact person in the different network head portrait libraries are extracted, so as to respond to the request issued by the terminal. Certainly, users of different terminals having the same contact person therein may be unfamiliar to each other, thus, the server can be configured to push head portraits of the requested contact person in all the terminals no matter whether or not the users of the terminals are familiar to each other, or configured to determine the users who know the user of the terminal issuing the request among the users of the terminals each having the head portrait of the requested contact person therein and only push the head portraits of the requested contact person in the terminals of the determined users (specifically, for the terminal A and the terminal B, if the address book of the terminal A has the contact information of the user of the terminal B or if the address book of the terminal B has the contact information of the user of the terminal A, or if the address book of the terminal A has the contact information of the user of the terminal B and the address book of the terminal B has the contact information of the user of the terminal A, the users of the terminal A and the terminal B are determined to be familiar to each other). By acquiring more head portrait information of the same contact person, the selectivity of the user increases.

In the technical solution, preferably, the processing method further includes establishing an association between each head portrait of the designated contact person in the designated interface and the source program corresponding to the head portrait, and displaying messages generated by the source program corresponding to the designated head portrait of the designated contact person in the designated interface or switching to a function interface provided by the source program corresponding to the designated head portrait directly according to a received selection operation exerted on the designated head portrait.

In the technical solution, by associating each head portrait of the designated contact person with an application program, through a contact person interface of a certain application program, messages generated by other application programs can be looked up directly and in time via the head portrait of the designated contact person. For example, beside the head portrait, a bubble box for displaying QQ chat messages of a user or update information of micro blog is displayed, or various application programs can be switched via the head portraits of the contact person, thereby facilitating the user to perform an operation.

By means of the technical solution, when the user performs an operation to set the head portrait of a designated contact person in the address book or in an application program, the head portraits of the contact person in application programs and the address book can be collected and displayed for the user to make a selection, thereby increasing user's selectivity and improving user's experience.

DETAILED DESCRIPTION OF ILLUSTRATED EMBODIMENTS

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present invention is not limited by the specific embodiments disclosed below.

Figure 1:
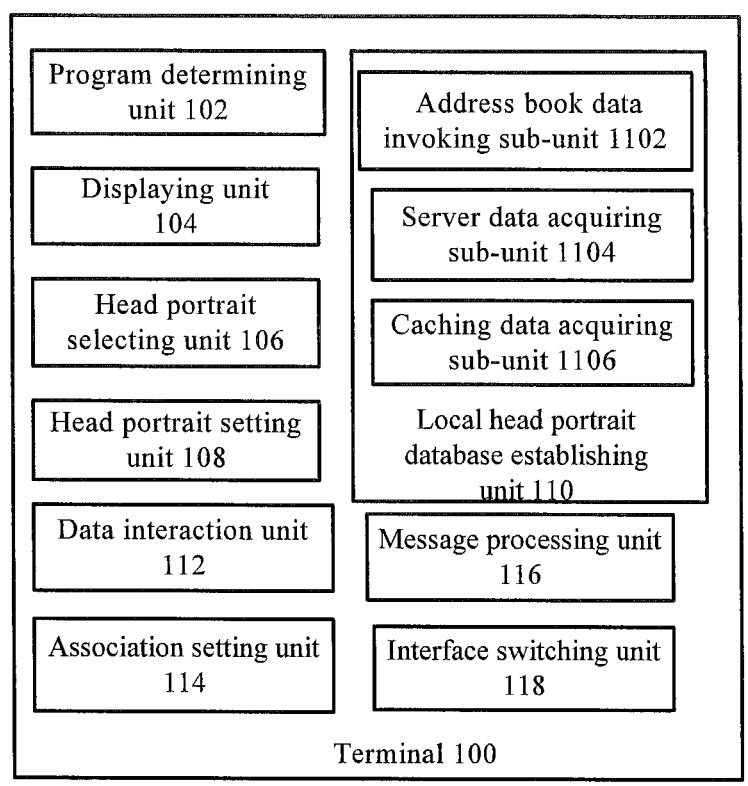
FIG. 1 shows a block diagram of a terminal in accordance with an exemplary embodiment of the present invention.

FIG. 1 shows a block diagram of a terminal in accordance with an exemplary embodiment of the present invention.

As shown in FIG. 1, a terminal 100 in accordance with an exemplary embodiment of the present invention includes a program determining unit 102 configured to determine at least one associated application program corresponding to a designated contact person in an address book of the terminal 100, and a displaying unit 104 configured to simultaneously display head portraits of the designated contact person in the address book and the at least one associated application program under the condition that the address book or a designated interface provided by any of the at least one associated application program is displayed.

In the technical solution, by simultaneously displaying head portraits of the same contact person in the address book and other application programs, it facilitates the user to perform an operation to look up and update the head portraits, and repeated switch among different application programs or interfaces can be avoided, thereby simplifying user's operation. Specific information of contact persons is stored in the address book and other application programs, thus application programs associated with the designated contact person in the address book can be found according to information matching.

In the technical solution, preferably, the program determining unit 102 is further configured to determine a designated application program as one associated application program of the designated contact person under the condition that the designated application program includes contact person information which matches information of the designated contact person, and/or under the condition that the information of the designated contact person includes account information of the designated application program.

In the technical solution, by determining the associated application program corresponding to the designated contact person, the head portraits of the contact person in various application programs can be conveniently displayed for the user to make a selection when the user performs an operation to set the head portrait of the contact person. Specifically, when the user performs an operation to store a contact person in the address book of the terminal, account information of the contact person in some application programs may be also stored, such as a Sina micro blog account, a QQ account, and so on, and accordingly it can be determined that the application programs associated with the contact person at least include Sina micro blog, QQ, and so on. Personal information of a contact person in an application program may include a mobile phone number of the contact person. Therefore, if the mobile phone number in personal information of the designated contact person in a certain application program matches the mobile phone number of a certain contact person in the address book, it can be determined that the application program is an associated application program of the contact person.

In the technical solution, preferably, the designated interface is a head portrait setting interface and/or a head portrait look-up interface provided by the application program corresponding to the designated interface.

In the technical solution, when the user performs an operation to set or look up the head portrait of the designated contact person in the address book of the terminal or in an application program, all head portrait information of the designated contact person in the corresponding application programs is displayed, thus the user can directly perform an operation to look up or set the head portrait without opening a various of application programs, which simplifies user's operation, enhances user's intuitive sense, and is beneficial for the user to make a selection. Also, for the setting of a head portrait, in the address book of the terminal, the head portrait of the owner or head portraits of other contact persons can be set randomly. In a third-party application program, besides the setting of the head portrait of the user (the user logs in to the third-part application program via an account and a password), head portraits of contact persons of the user in the third-party application program can also be set. Wherein, the setting of the head portrait of a contact person may be determined to be a remark for the contact person, and may not be able to change the head portrait actually used by the contact person (that is, when the contact person logs in to the same application program, the head portrait in its interface may not be changed). For example, in QQ, a certain contact person sets the head portrait of himself/herself to be a comic strip, and often changes his/her username. To avoid getting the wrong person, a true person's head can be set to be a remark. Thus, even if the contact person sets a new head portrait for himself/herself, the contact person can be recognized.

In the technical solution, preferably, the terminal further includes a head portrait selecting unit 106 configured to select one head portrait from at least one head portrait displayed in the designated interface according to a received head portrait selection command, and a head portrait setting unit 108 configured to set the selected head portrait to be the head portrait of the designated contact person in the application program corresponding to the designated interface, or to be the head portraits of the designated contact person in the address book and in the at least one associated application programs corresponding to the designated contact person.

In the technical solution, by selecting one head portrait from the displayed head portraits, the user does not need to perform an operation to look up various application programs, and furthermore the user does not need to perform a manual operation to download a head portrait which needs to be set, thus user's operation is simplified, and also to a certain extend the association among a specific contact person and various application programs corresponding to the specific contact person can be enhanced. Specifically, when the user performs an operation to set a head portrait of a contact person in a specific application program, e.g., Sina micro blog, the head portrait of the contact person in the address book of the terminal and the head portraits of the contact person in all the corresponding application programs can be set to be the same, thereby facilitating the user to recognize the same contact person in different application programs. Certainly, the user can only set the selected head portrait to be the head portrait of the contact person in Sina micro blog, and in other application programs and the address book the head portraits of the contact person are set to be different.

In the technical solution, preferably, the terminal further includes a local head portrait database establishing unit 110 configured to establish a local head portrait database in the terminal, acquire the head portraits of the designated contact person in the address book and the at least one associated application program, and store the designated contact person and the corresponding head portraits in the local head portrait database in a related manner. Wherein, under the condition that the head portraits of the designated contact person in the designated interface need to be displayed, the displaying unit acquires the corresponding head portraits from the local head portrait database and displays the acquired head portraits.

In the technical solution, by establishing the local head portrait database, when the user performs an operation to set the head portrait of a specific contact person, the local head portrait database is searched and each time it does not need to search all file folders in the terminal, thus user's waiting time is reduced, and furthermore it does not need to acquire head portraits from a network, thereby enhancing manipulability of the technical solution. Specifically, different storage directories corresponding to each contact person can be established in the local head portrait database. When setting or looking up the head portrait of a specific contact person, it only needs to search the storage directories corresponding to the specific contact person, and the found storage directories are displayed for the user to make a selection, which is beneficial for reducing response time.

In the above-mentioned technical solution, preferably, the local head portrait database establishing unit 110 includes an address book data invoking sub-unit 1102 configured to invoke contact person information in the address book and acquire the head portrait information of the designated contact person when it needs to acquire the head portrait of the designated contact person in the address book. The local head portrait database establishing unit 110 further includes a sever data acquiring sub-unit 1104 or a caching data acquiring sub-unit 1106. Wherein, the server data acquiring sub-unit 1104 is configured to acquire the head portrait of the designated contact person from at least one server each corresponding to one of the at least one associated application program when it needs to acquire the head portrait of the designated contact person in the at least one associated application program. The caching data acquiring sub-unit 1106 is configured to acquire the head portrait of the designated contact person from at least one local caching file in the terminal each corresponding to one of the at least one associated application program when it needs to acquire the head portrait of the designated contact person in the at least one associated application program.

In the technical solution, in the address book of the terminal the head portrait of the designated contact person is included in the personal information of the designated contact person. By invoking the personal information of the designated contact person, the head portrait information of the designated contact person can be conveniently extracted. When the user performs an operation to look up the head portrait of the contact person in a third-party application program, in one case, the head portrait can be acquired from a local caching file without connecting to a network, thereby reducing the demand for a network. In another case, if the user hopes to look up the latest head portrait of the contact person, as the head portrait of the contact person is set and managed by himself/herself, it needs to acquire the latest head portrait from the server corresponding to the application program, thus the head portrait information of the contact person can be updated in time.

In the above-mentioned technical solution, preferably, the displaying unit 104 is further configured to display the head portrait of the designated contact person in an address book of a terminal of at least one other contact person in the designated interface, wherein the at least one other contact person is the contact person in the address book of the terminal of the designated contact person or the at least one associated application program.

In the technical solution, the information of the same contact person can be stored in terminals of different users, and some user can perform an operation to acquire the head portraits of the designated contact person set by other users, and the selectivity of setting a head portrait by the user increases.

In the above-described technical solution, preferably, a network head portrait database corresponding to the terminal is established in a designated server. When when at least one contact person and the head portrait of the at least one contact person in an address book of a terminal of at least one other contact person are stored in a related manner in the network head portrait database and the at least one other contact person is the contact person in the address book of the terminal of the at least one contact person or the at least one associated application program, the terminal further includes a data interaction unit 112 configured to acquire the head portraits of the designated contact person from the network head portrait database when the head portraits of the designated contact person in the designated interface need to be displayed, and the displaying unit displays the acquired head portraits.

In the technical solution, by establishing the network head portrait database, when the user performs an operation to set the head portrait of a specific contact person, the server can directly search the corresponding network head portrait database, thereby saving the storage space of the terminal, and search operation can be handed over to the server to reduce requirements for operation ability of the terminal, to fully use powerful operation and search ability of the server, and to reduce response time for user's request.

In the technical solution, preferably, the data interaction unit 112 is further configured to upload at least one contact person and the head portrait of the at least one contact person in the address book to the network head portrait database in a related manner.

In the technical solution, by uploading the head portrait of the designated contact person in the address book of the designated terminal to the network head portrait database, when the other user performs an operation to set the portrait head of the designated contact person, the head portrait information in the address book of the designated terminal can be found. If more and more terminals upload contact person information in their address books to the server, it is more beneficial to collect and analyze data, and accordingly the selectivity for setting a head portrait increases.

In the technical solution, preferably, the data interaction unit 112 is further configured to transmit a request for acquiring head portraits to the designated server, so as to acquire the head portrait of the designated contact person from at least one other terminal's network head portrait database in the designated server and add the acquired head portrait to the network head portrait database corresponding to the terminal. Wherein, the other terminal is the terminal of at least one contact person who is the contact person in the address book of the terminal of the designated contact person or the at least one associated application program.

In the technical solution, all terminals upload contact person information in their address books to the server, so as to establish network head portrait libraries each corresponding to one terminal. When a certain terminal issues a request for head portraits of a certain contact person, according to the information of the contact person, such as the name, the mobile phone number, the account used in a third-party application program, and so on, different network head portrait libraries are searched to find the contact person, and the head portraits of the contact person in the different network head portrait libraries are extracted, so as to respond to the request issued by the terminal. Certainly, users of different terminals having the same contact person therein may be unfamiliar to each other, thus, the server can be configured to push head portraits of the requested contact person in all the terminals no matter whether or not the users of the terminals are familiar to each other, or configured to determine the users who know the user of the terminal issuing the request among the users of the terminals each having the head portrait of the requested contact person therein, and only push the head portraits of the requested contact person in the terminals of the determined users (specifically, for the terminal A and the terminal B, if the address book of the terminal A has the contact information of the user of the terminal B or if the address book of the terminal B has the contact information of the user of the terminal A, or if the address book of the terminal A has the contact information of the user of the terminal B and the address book of the terminal B has the contact information of the user of the terminal A, the users of the terminal A and the terminal B are determined to be familiar to each other). By acquiring more head portrait information of the same contact person, the selectivity of the user increases.

In the technical solution, preferably, the terminal further includes an association setting unit 114 configured to establish an association between each head portrait of the designated contact person in the designated interface and the source program corresponding to the head portrait. The terminal further includes a message processing unit 116 or an interface switching unit 118. Wherein, the message processing unit 116 is configured to display messages generated by the source program corresponding to the designated head portrait of the designated contact person in the designated interface according to a received selection operation exerted on the designated head portrait. The interface switching unit 118 is configured to directly switch to a function interface provided by the source program corresponding to the designated head portrait according to a received selection operation exerted on the designated head portrait.

In the technical solution, by associating each head portrait of the designated contact person with an application program, through a contact person interface provided by a certain application program, messages generated by other application programs can be looked up directly and in time via the head portraits of the contact person. For example, beside one head portrait, a bubble box for displaying QQ chat messages of a user or update information of micro blog is displayed, or various application programs can be switched via the head portraits of the contact person, thereby facilitating the user to perform an operation.

Figure 2:
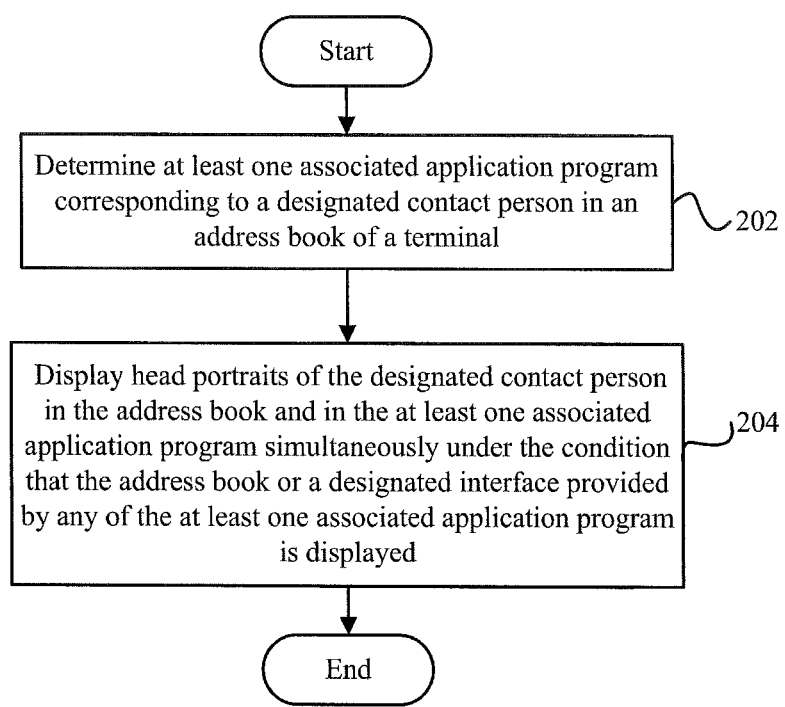
FIG. 2 shows a flow chart of a processing method for head portraits of a contact person in accordance with an exemplary embodiment of the present invention.

FIG. 2 shows a flow chart of a processing method for head portraits of a contact person in accordance with an exemplary embodiment of the present invention.

As shown in FIG. 2, a processing method for head portraits of a contact person in accordance with an exemplary embodiment of the present invention includes: step 202, determining at least one associated application program corresponding to a designated contact person in an address book of the terminal, and step 204, displaying head portraits of the designated contact person in the address book and the at least one associated application program simultaneously when the address book or a designated interface provided by any of the at least one associated application program is displayed.

In the technical solution, by simultaneously displaying head portraits of the same contact person in the address book and other application programs, it facilitates the user to look up and update the head portraits, and repeated switch among different application programs or interfaces can be avoided, thereby simplifying user's operation. Specific information of contact persons is stored in the address book and other application programs, thus application programs associated with the designated contact person in the address book can be found according to information matching.

In the technical solution, preferably, the step of determining the at least one associated application program corresponding to the designated contact person includes determining a designated application program as the associated application program of the designated contact person if the designated application program includes contact information which matches information of the designated contact person, and/or the information of the designated contact person includes account information of the designated application program.

In the technical solution, by determining the associated application program corresponding to the designated contact person, the head portraits of the contact person in various application programs can be conveniently displayed for the user to make a selection when the user performs an operation to set the head portrait of the contact person. Specifically, when the user performs an operation to store a contact person in the address book of the terminal, account information of the contact person in some application programs may be also stored, such as a Sina micro blog account, a QQ account, and so on, and accordingly it can be determined that the application programs associated with the contact person at least include Sina micro blog, QQ, and so on. Personal information of a contact person in an application program may include a mobile phone number of the contact person.

Therefore, if the mobile phone number in personal information of the designated contact person in a certain application program matches the mobile phone number of a certain contact person in the address book, it can be determined that the application program is the associated application program of the contact person.

In the technical solution, preferably, the designated interface is a head portrait setting interface and/or a head portrait look-up interface provided by the application program corresponding to the designated interface.

In the technical solution, when the user performs an operation to set or look up the head portrait of the designated contact person in the address book of the terminal or in an application program, all head portrait information of the designated contact person in the corresponding application programs is displayed, thus the user can directly perform an operation to look up or set the head portrait without opening a various of application programs, which simplifies user's operation, enhances user's intuitive sense, and is beneficial for the user to make a selection. Also, for the setting of a head portrait, in the address book of the terminal, the head portrait of the owner or head portraits of other contact persons can be set randomly. In a third-party application program, besides the setting of the head portrait of the user (the user logs in to the third-part application program via an account and a password), head portraits of contact persons in the third-party application program can also be set. Wherein, the setting of the head portrait of a contact person may be determined to be a remark for the contact person, and may not be able to change the head portrait actually used by the contact person (that is, when the contact person logs in to the same application program, the head portrait in its interface may not be changed). For example, in QQ, a certain contact person sets the head portrait of himself/herself to be a comic strip, and often changes his/her username. To avoid getting the wrong person, a true person's head can be set to be a remark. Thus, even if the contact person sets a new head portrait for himself/herself, the contact person can be recognized.

In the technical solution, preferably, the method further includes selecting one head portrait from at least one head portrait displayed in the designated interface according to a received head portrait selection command. Wherein, the selected head portrait is set to be the head portrait of the designated contact person in the application program corresponding to the designated interface, or to be the head portraits of the designated contact person in the address book and in the at least one associated application programs corresponding to the designated contact person.

In the technical solution, by selecting one head portrait from the displayed head portraits, the user does not need to perform an operation to look up various application programs, and furthermore the user does not need to perform a manual operation to download a head portrait which needs to be set, thus user's operation is simplified, and also to a certain extend the association among a specific contact person and various application programs corresponding to the specific contact person can be enhanced. Specifically, when the user performs an operation to set a head portrait of a contact person in a specific application program, e.g., Sina micro blog, the head portrait of the contact person in the address book of the terminal and the head portraits of the contact person in all the corresponding application programs can be set to be the same, thereby facilitating the user to recognize the same contact person in different application programs. Certainly, the user can only set the selected head portrait to be the head portrait of the contact person in Sina micro blog, and in other application programs and in the address book the head portraits of the contact person are set to be different.

In the technical solution, preferably, the method further includes establishing a local head portrait database in the terminal, obtaining the head portraits of the designated contact person in the address book and the at least one associated application program, and storing the designated contact person and the corresponding head portraits in the local head portrait database in a related manner. Wherein, when the head portraits of the designated contact person in the designated interface need to be displayed, the corresponding head portraits are acquired from the local head portrait database and displayed.

In the technical solution, by establishing the local head portrait database, when the user performs an operation to set the head portrait of a specific contact person, the local head portrait database is searched and each time it does not need to search all file folders in the terminal, thus user's waiting time is reduced, and furthermore it does not need to acquire head portraits from a network, thereby enhancing manipulability of the technical solution. Specifically, different storage directories corresponding to each contact person can be established in the local head portrait database. When setting or looking up the head portrait of a specific contact person, it only needs to search the storage directories corresponding to the specific contact person, and the found storage directories are then displayed for the user to make a selection, which is beneficial for decreasing response time.

In the above-mentioned technical solution, preferably, the step of acquiring the head portrait of the designated contact person in the address book includes invoking contact person information in the address book and acquiring the head portrait information of the designated contact person. The step of acquiring the head portrait of the designated contact person in the at least one association application program includes acquiring the head portrait of the designated contact person from at least one server each corresponding to one of the at least one associated application program, and/or acquiring the head portrait of the designated contact person from at least one local caching file in the terminal each corresponding to one of the at least one associated application program.

In the technical solution, in the address book of the terminal the head portrait of the designated contact person is included in the personal information of the designated contact person. By invoking the personal information of the designated contact person, the head portrait information of the designated contact person can be conveniently extracted. When the user performs an operation to look up the head portrait of a contact person in a third-party application program, in one case, the head portrait can be acquired from a local caching file without connecting to a network, which reduces the demand for a network. In another case, if the user hopes to look up the latest head portrait of the contact person, as the head portrait of the contact person is set and managed by himself/herself, it needs to acquire the latest head portrait from the server corresponding to the application program, thus the head portrait information of the contact person can be updated in time.

In the above-mentioned technical solution, preferably, the method further includes displaying the head portrait of the designated contact person in an address book of a terminal of at least one other contact person in the designated interface, wherein the at least one other contact person is the contact person in the address book of the terminal of the designated contact person or the at least one associated application program.

In the technical solution, the information of the same contact person can be stored in terminals of different users, and some user can perform an operation to acquire the head portraits of the designated contact person set by other users, and the selectivity of setting a head portrait by the user increases.

In the above-described technical solution, preferably, the network head portrait database corresponding to the terminal is established in the designated server. When at least one contact person and the head portrait of the at least one contact person in an address book of a terminal of at least one other contact person are stored in a related manner in the network head portrait database and the at least one other contact person is the contact person in the address book of the terminal of the at least one contact person or the at least one associated application program, the processing method further includes acquiring the head portraits of the designated contact person from the network head portrait database when the head portraits of the designated contact person in the designated interface need to be displayed, and displaying the acquired head portraits.

In the technical solution, by establishing the network head portrait database, when the user performs an operation to set the head portrait of a specific contact person, the server can directly search the network head portrait database, thereby saving the storage space of the terminal, and search operation can be handed over to the server to reduce requirements for operation ability of the terminal, to fully use powerful operation and search ability of the server, and to reduce response time for user's request.

In the technical solution, preferably, the processing method further includes uploading at least one contact person and the head portrait of the at least one contact person in the address book to the network head portrait database in a related manner.

In the technical solution, by uploading the head portrait of the designated contact person in the address book of the designated terminal to the network head portrait database, when the other user performs an operation to set the head portrait of the designated contact person, the head portrait information in the address book of the designated terminal can be found. If more and more terminals upload contact person information in their address books to the server, it is more beneficial to collect and analyze data, and accordingly the selectivity for setting a head portrait increases.

In the technical solution, preferably, the processing method further includes transmitting a request for acquiring head portraits to the designated server, so as to acquire the head portrait of the designated contact person from at least one other terminal's network head portrait database in the designated server and adding the acquired head portrait to the network head portrait database corresponding to the terminal. Wherein, the other terminal is the terminal of at least one contact person who is the contact person in the address book of the terminal of the designated contact person or the at least one associated application program.

In the technical solution, all terminals upload contact information in their address books to the server, so as to establish network head portrait libraries each corresponding to one terminal. When a certain terminal issues a request for head portraits of a certain contact person, according to the information of the contact person, such as the name, the mobile phone number, the account information used in a third-party application program, and so on, different network head portrait libraries are searched to find the contact person, and the head portraits of the contact person in the different network head portrait libraries are extracted, so as to respond to the request issued by the terminal. Certainly, users of different terminals having the same contact person therein may be unfamiliar to each other, thus the server can be configured to push head portraits of the requested contact person in all the terminals no matter whether or not the users of the terminals are familiar to each other, or configured to determine the users who know the user of the terminal issuing the request among the users of the terminals each having the head portrait of the requested contact person therein, and only push the head portraits of the requested contact person in the terminals of the determined users (specifically, for the terminal A and the terminal B, if the address book of the terminal A has the contact information of the user of the terminal B or if the address book of the terminal B has the contact information of the user of the terminal A, or if the address book of the terminal A has the contact information of the user of the terminal B and the address book of the terminal B has the contact information of the user of the terminal A, the users of the terminal A and the terminal B are determined to be familiar to each other). By acquiring more head portrait information of the same contact person, the selectivity of the user increases.

In the technical solution, preferably, the processing method further includes establishing an association between each head portrait of the designated contact person in the designated interface and the source program corresponding to the head portrait, and displaying messages generated by the source program corresponding to the designated head portrait of the designated contact person in the designated interface or switching to a function interface provided by the source program corresponding to the designated head portrait directly according to a received selection operation exerted on the designated head portrait.

In the technical solution, by associating each head portrait of the designated contact person with an application program, through a contact person interface of a certain application program, messages generated by other application programs can be looked up directly and in time via the head portrait of the designated contact person. For example, beside the head portrait, a bubble box for displaying QQ chat messages of a user or update information of micro blog is displayed, or various application programs can be switched via the head portrait of the contact person, thereby facilitating the user to perform an operation.

FIGS. 3A-3G show schematic views of interfaces used for association process for head portraits in an address book and a third-party application program in accordance with an exemplary embodiment of the present invention.

Figure 3A:
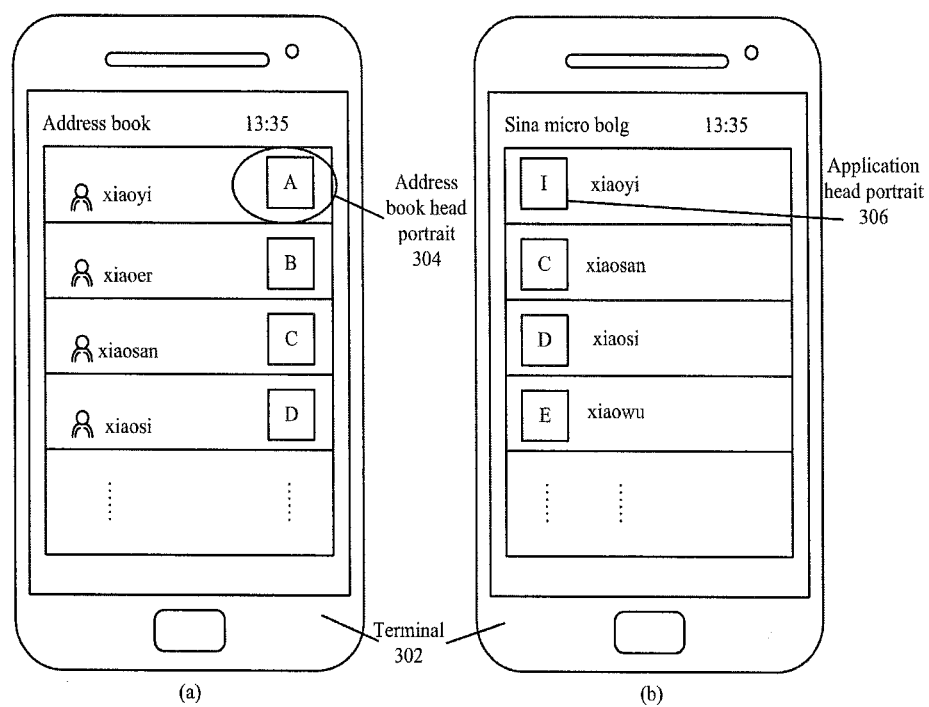
FIGS. 3A-3G show schematic views of interfaces used for association processing for head portraits in an address book and third-party applications in accordance with an exemplary embodiment of the present invention.

FIG. 3A (a) is a schematic view of an interface of an address book in a terminal 302. The address book includes information of different contact persons. For example, for the contact person "xiaoyi", a head portrait 304 in the address book is assigned to him/she for recognition. With the development of terminal application, besides the conventional address book, many other application programs, especially various social communication applications, e.g., Sina micro blog shown in FIG. 3A (b), include information of many contact persons.

Thus, for the same contact person, for example "xiaoyi", the personal head portraits in different application programs may be different. For example, in the address book shown in FIG. 3A (a), the address book head portrait 304 is "A", while in Sina micro blog shown in FIG. 3A (b), the application head portrait 306 is "I". In the address book, the information of contact persons are set by the owner of the terminal, and there is no problem when using the terminal. While in third-party social applications, the information of contact persons are set by themselves. Some people always like to update their head portraits, names, and so on, and at some time the user cannot determine the real identity of a certain contact person, and other manners may be needed to validate the identity, which may bring trouble to the user.

Therefore, the present application hopes to manage information of the same contact person in different application programs (including address books and third-party application programs) uniformly. Particularly, the information referred herein refers head portraits of contact persons.

Figure 3B:
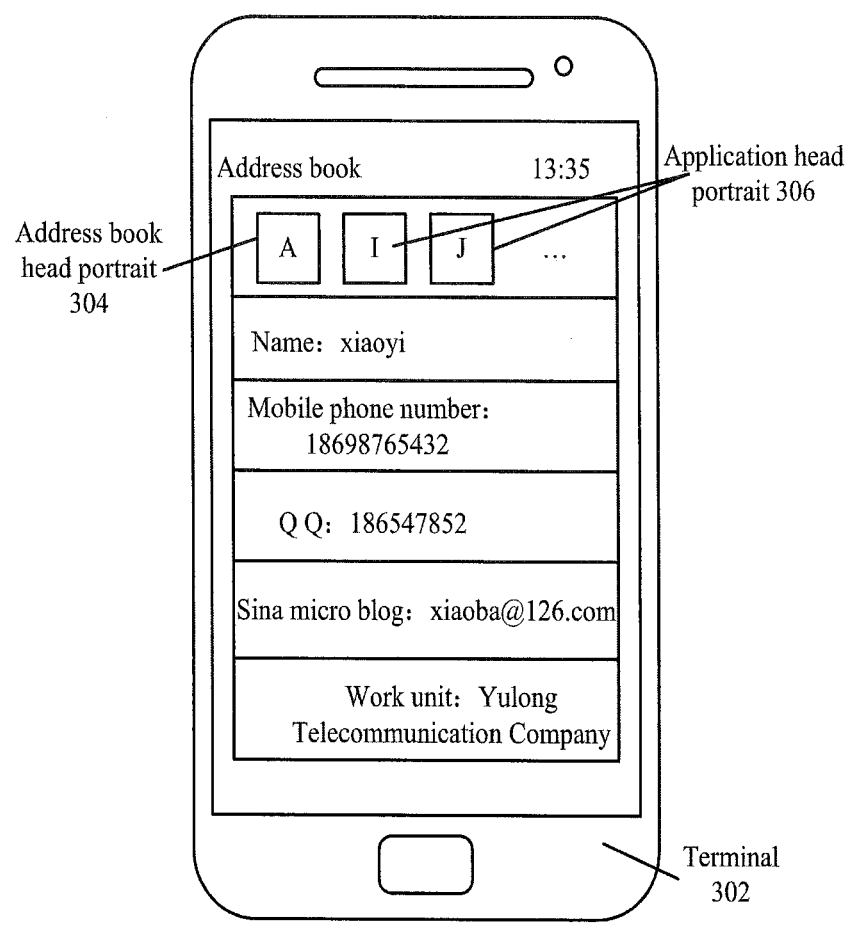

The address book will be taken as an example to illustrate the present invention in detail. However, those skilled in the art should understand that similar manners may be adopted for any other application program including information of contact persons. As shown in FIG. 3B, in the contact person information of the contact person "xiaoyi", the address book head portrait 304 in the address book set by the user and the application head portrait 306 of "xiaoyi" in a third-party application program simultaneously exist in the contact person information of the address book.

Various manners may be adopted to acquire head portraits of a contact person in different application programs. For example, in a first manner, a caching file may be generated in the terminal when logging in to a certain application program via the terminal, and one head portrait of the contact person can be acquired from the caching file. In a second manner, the terminal can directly acquire one head portrait of the contact person from the sever corresponding to the designated application program, to acquire a real time head portrait of the contact person.

Certainly, besides displaying a plurality of head portraits of the contact person in a look-up interface of contact person information shown in FIG. 3B, the user can adopt the following processing manners if there are too many head portraits and the interface may become too confused when the head portraits are simultaneously displayed.

In a first manner, only the head portrait corresponding to the current application program is displayed. For example, as shown herein, the address book head portrait 304 is displayed, or the address book head portrait 304 and the application head portraits 306 in a part of other application programs are displayed, and as shown in FIG. 3B an apostrophe " . . . " is used to indicate that there are other head portraits which are not been displayed. When the icon of the apostrophe " . . . " is clicked, the interface shown in FIG. 3C is displayed to display all the head portraits of the contact person.

In a second manner, in the look-up interface of contact person information, only the address book head portrait 304 is displayed (if in the other application program, the application head portrait corresponding to the application program is displayed). When the user performs an operation to select to look up or set the head portrait, the interface shown in FIG. 3C is displayed again to display all the head portraits of the contact person.

Figure 3C:
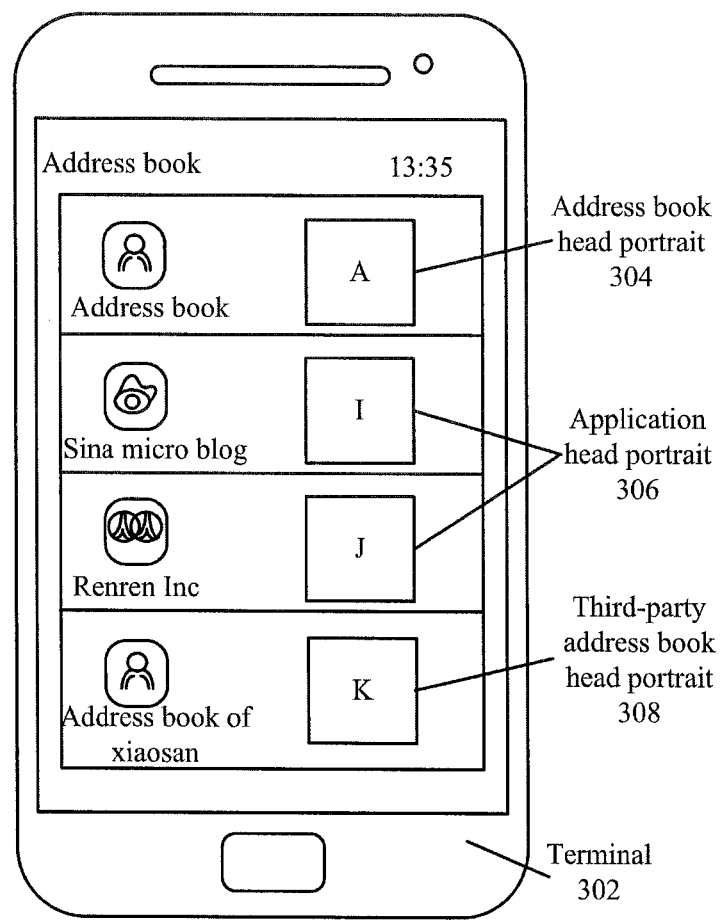
Figure 3D:
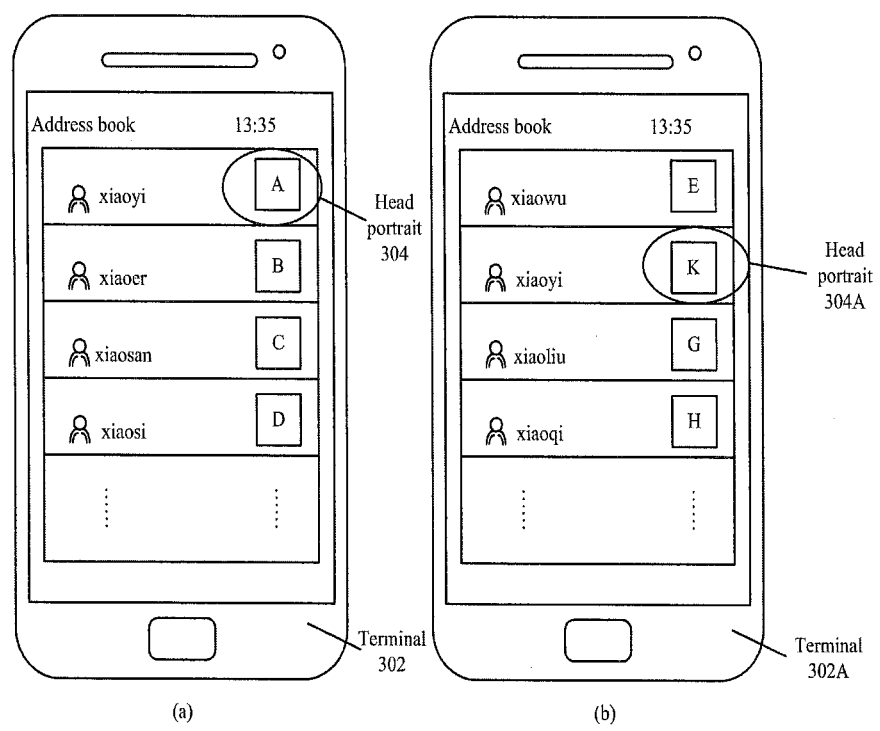

It can be seen that in FIG. 3C besides the address book head portrait 304 and the application head portrait 306, a third-party address book head portrait 308 is further included. The third-party address book head portrait 308 referred herein is the head portrait of the same contact person (e.g., "xiaoyi") in the address book of the other contact person (e.g., the address book of "xiaosan"). To understand easily, for example, in FIG. 3D, in FIG. 3D (a) in the address book of the terminal 302 the user performs an operation to set the head portrait 304 of the contact person "xiaoyi" to be "A", and in FIG. 3D (b) in the address book of the terminal 302A of "xiaosan", "xiaosan" performs an operation to set the head portrait 304A of the contact person "xiaoyi" to be "K".

By way of the following way, "K" can be displayed in the address book of the terminal 302 shown in FIG. 3C. All terminals upload information of contact persons in their address books to a server. When the terminal 302 needs to acquire the head portraits of the contact person "xiaoyi" in the other terminals, the contact person information of "xiaoyi" in all the terminals are determined according to the contact person information of "xiaoyi" in the terminal 302, and then all the head portraits are acquired from the acquired contact person information. When the terminal 302 requires the head portrait information of "xiaoyi", the terminal 302 acquires all the head portraits from the server.

Also, besides that the head portraits in various application can be displayed in a same application program, the user can perform an operation to select any head portrait from the displayed head portraits to update the current head portrait information of the contact person. Furthermore, the user can perform an operation to set the head portrait for each application program individually, and also can set the head portrait for a certain application program, and directly update the head portraits of all the application programs with the head portrait of the certain application program.

Certainly, it needs to be explained that it is easy to understand that the owner of the terminal 302 is easy to perform an operation to set the head portrait of any contact person in the address book of the terminal 302. While the action of the owner performing an operation to set the head portrait for a certain contact person (e.g., "xiaoyi") in Sina micro blog through the terminal 302 is different from that of "xiaoyi" performing an operation to update the head portrait for himself or herself in Sina micro blog. In should be understood that the head portrait of "xiaoyi" set by the owner can be only displayed in the terminal 302 and used as a remark for contact person information of "xiaoyi" and cannot affect the head portrait updated by "xiaoyi".

Additionally, by executing a recognition on image content, the terminal can intelligently determine which image can be set to be a head portrait. Specifically, for example, the terminal scans caching files corresponding to the designated application program to acquire an image caching directory corresponding to the designated contact person, executes face recognition on images in the image caching directory, determines an individual photo as the image of the head portrait of the designated contact person, and recommends the individual photo to the owner of the terminal. Whether or not to use the individual photo as the head portrait of the designated contact person is determined according to owner's operation.

When determining the image which can be used as the head portrait of the designated contact person, the terminal can further determine whether or not each image in the image caching directory is captured by a front-facing camera of the terminal, and determines that the individual photo captured by the front-facing camera can be used as the image of the head portrait of the designated contact person. The detailed recognition manner can be described as below. The proportion of the face in the whole image is determined. If the proportion is greater than or equal to a preset proportion, it can be determined that the image is captured by the front-facing camera. Or the resolution of the image is recognized. If the resolution is less than or equal to a preset resolution, it can be determined that the image is captured by the front-facing camera.

When determining the image which can be used as the head portrait of the designated contact person, the face recognized from the image can be compared with the face in the head portrait of the designated contact person. If there is a match, it can be determined that the image can be used to be the image of the head portrait of the designated contact person.

When determining the image which can be used as the head portrait of the designated contact person, whether or not the image has been edited is also determined. If the image has been edited, for example, if a third-party software has been used to adjust the color, brightness, and saturation of the image to beautify the image, it can be determined that the image can be used as the image of the head portrait of the designated contact person.

Figure 3E:
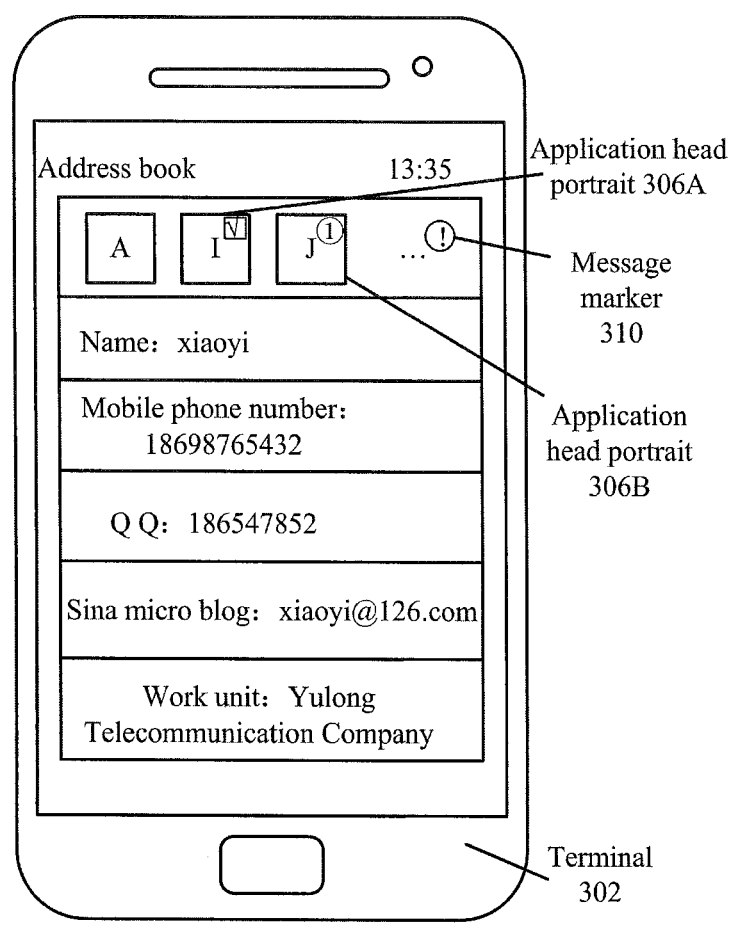

As shown in FIG. 3E, in the contact person interface of a certain application program, for example, in the address book, as among the plurality of head portraits of the contact person each head portrait has corresponding source, e.g., the head portrait A is the head portrait in the address book, the head portrait I is the head portrait in Sina micro blog, the head portrait J is the head portrait in QQ, these head portraits can be set to be associated with corresponding application programs. Specifically, when communication events occur in these application programs, for example, when update messages and instant communication messages are received, the corresponding head portraits can be directly set to indicate that there are communication events.

Figure 3F:
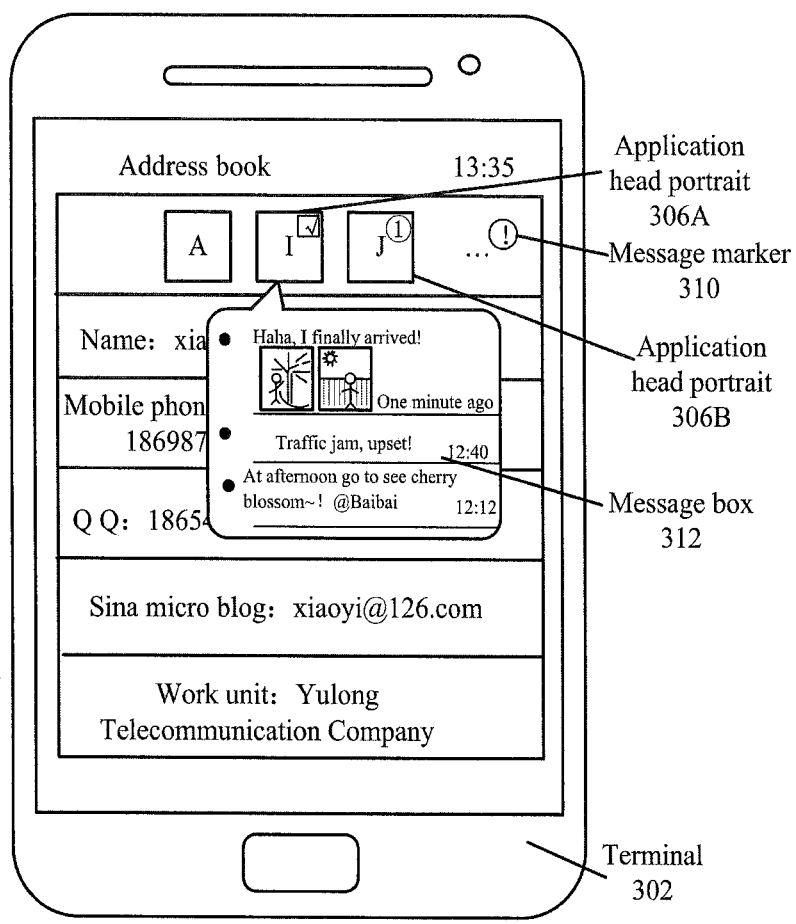

For example, for the application head portrait 306A, when the contact person "xiaoyi" releases new micro blog and the owner of the terminal does not perform an operation to look up the new micro blog, the application head portrait 306A can be marked with a certain marker, e.g., the marker ☑ shown in FIG. 3E, at its certain position or at its periphery, so as to prompt the owner of the terminal. When the owner of the terminal 302 performs an operation for looking up the message on the application head portrait 306A, specifically, when the marker ☑ is clicked, as shown in FIG. 3F, a portion of messages which are not been looked up can be directly displayed in the current interface via a message box 312. Certainly, the content in the message box 312 can be dragged to display more messages issued by "xiaoyi" at earlier time for the user to browse, and the user can further directly make a reply for the messages in the message box 312.

Figure 3G:
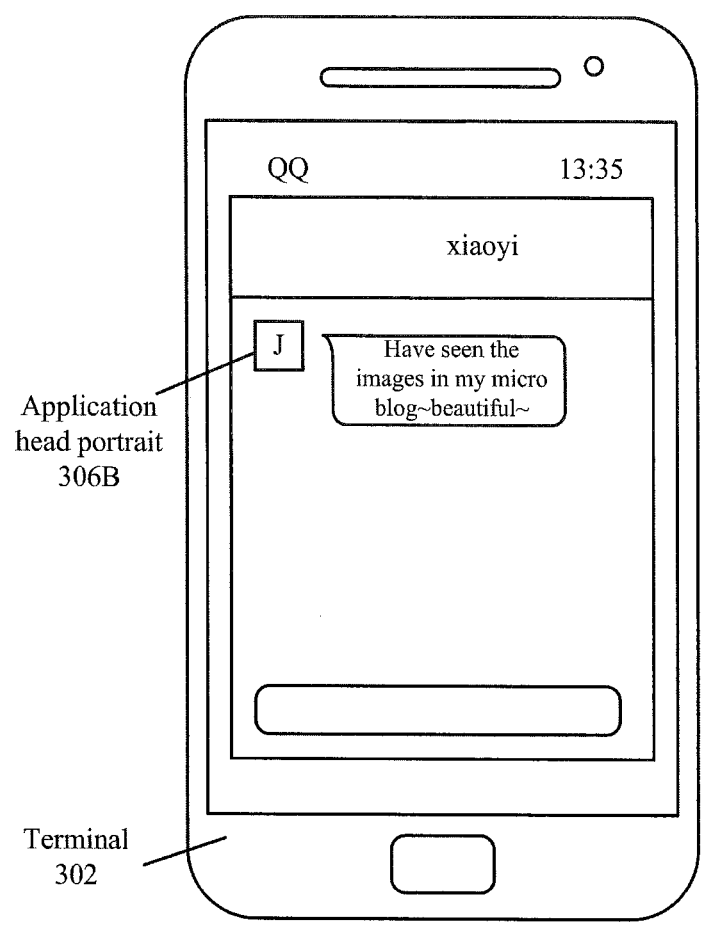

For example, for the application head portrait 306B, when the contact person "xiaoyi" issues a new instant communication message, as shown in FIG. 3E, the marker ① or the like can be used to indicate that there are instant communication messages which are not been looked up and which can indicate the number of the instant communication messages. When the owner of the terminal 302 performs an operation for looking up a message on the application head portrait 306B, specifically, for example, when the owner clicks the marker ①, the current interface is directly switched to the corresponding application program interface as shown in FIG. 3G, to facilitate the user to look up the message and make a reply.

Also, as shown in FIG. 3E, when there are messages which are not been looked up in the application programs which head portraits are not displayed in the current interface, a message marker 310 shown in FIG. 3E can be displayed near the marker " . . . " which is used to indicate that there are more head portraits which are not been displayed, to indicate that there are messages which are not been looked up, so as to prompt the user.

Certainly, even if there is no communication message, the interface provided by an application program can be directly displayed via its corresponding head portrait. Specifically, for example, when a certain head portrait is clicked, interface switch is directly executed.

It needs to be explained that for any head portrait and its corresponding application program, whether or not switching application program interfaces by the head portrait is allowed, whether or not displaying a prompt for a communication message on the head portrait is allowed, adopting which manner to make a prompt, and adopting which manner to display a communication message (for example, a bubble box, an interface switch, or other) can be set by the manufacture or the user according to actual condition, to satisfy current actual needs.

Figure 4:
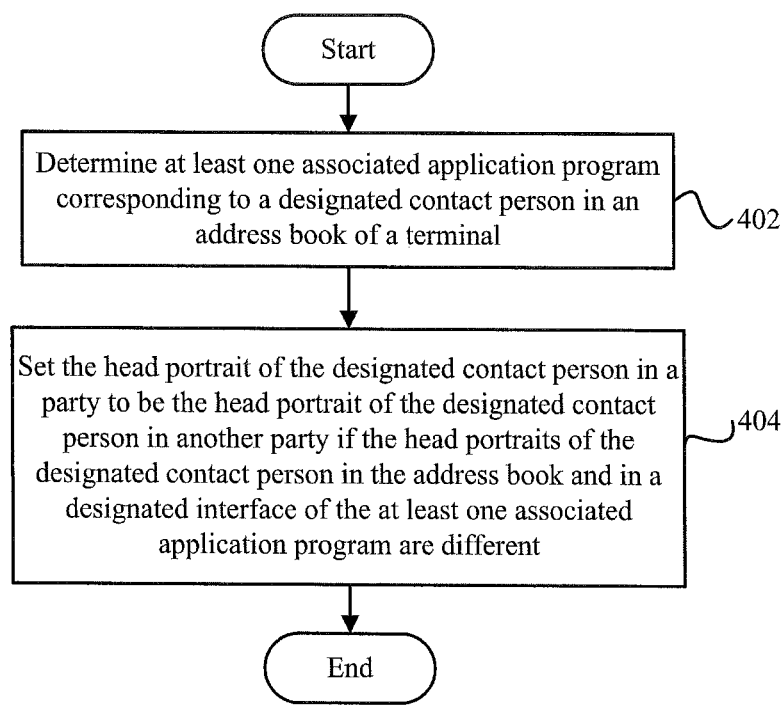
FIG. 4 shows a flow chart of a processing method for head portraits of a contact person in accordance with another exemplary embodiment of the present invention.

FIG. 4 is a flow chart of a processing method for head portraits of a contact person in accordance with an exemplary embodiment of the present invention.

As shown in FIG. 4, a processing method for head portraits of a contact person in accordance with an exemplary embodiment of the present invention includes: step 402, determining at least one associated application program corresponding to a designated contact person in an address book of the terminal, and step 404, setting the head portrait of the designated contact person in a party to be the head portrait of the designated contact person in another party if the head portraits of the designated contact person in the address book and a designated interface of the at least one associated application program are different. Specifically, step 204 includes setting the head portrait of the designated contact person in the address book to be the head portrait of the designated contact person in the designated interface of the associated application program, and/or setting the head portrait of the designated contact person in the designated interface of the associated application program to be the head portrait of the designated contact person in the address book.

In the technical solution, the head portraits of the same contact person in the address book and the associated application program are compared, and the head portraits can be directly modified if they are not the same. The modification includes setting the head portrait in one party to be the head portrait in another party, or switching the head portraits between two parties.

In the above-described technical solution, preferably, the processing method further includes displaying the head portrait of the designated contact person in an address book of a terminal of at least one other contact person in the designated interface, wherein the at least one other contact person is the contact person in the address book of the terminal of the designated contact person or the at least one associated application program.

In the technical solution, the information of the same contact person can be stored in terminals of different users, and some user can perform an operation to acquire the head portraits of the designated contact person set by other users, and the selectivity of setting a head portrait by the user increases.

In the above-described technical solution, preferably, the network head portrait database corresponding to the terminal is established in the designated server. When at least one contact person and the head portrait of the at least one contact person in an address book of a terminal of at least one other contact person are stored in a related manner in the network head portrait database and the at least one other contact person is the contact person in the address book of the terminal of the at least one contact person or the at least one associated application program, the processing method further includes acquiring the head portraits of the designated contact person from the network head portrait database when the head portraits of the designated contact person in the designated interface need to be displayed, and displaying the acquired head portraits.

In the technical solution, by establishing the network head portrait database, when the user performs an operation to set the head portrait of a specific contact person, the server can directly search the network head portrait database, thereby saving the storage space of the terminal, and search operation can be handed over to the server to reduce requirements for operation ability of the terminal, to fully use powerful operation and search ability of the server, and to reduce response time for user's request.

In the technical solution, preferably, the processing method further includes uploading at least one contact person and the head portrait of the at least one contact person in the address book to the network head portrait database in a related manner.

In the technical solution, by uploading the head portrait of the designated contact person in the address book of the designated terminal to the network head portrait database, when the other user performs an operation to set the head portrait of the designated contact person, the head portrait information in the address book of the designated terminal can be found. If more and more terminals upload contact person information in their address books to the server, it is more beneficial to collect and analyze data, and accordingly the selectivity for setting a head portrait increases.

In the technical solution, preferably, the processing method further includes transmitting a request for acquiring a head portrait to the designated server, so as to acquire the head portrait of the designated contact person from at least one other terminal's network head portrait database in the designated server and adding the acquired head portraits to the network head portrait database corresponding to the terminal of the designated contact person. Wherein, the other terminal is the terminal of at least one contact person who is the contact person in the address book of the terminal of the designated contact person or the at least one associated application program.

In the technical solution, all terminals upload contact information in their address books to the server, so as to establish network head portrait libraries each corresponding to one terminal. When a certain terminal issues a request for head portraits of a certain contact person, according to the information of the contact person, such as the name, the mobile phone number, the account used in a third-party application program, and so on, different network head portrait libraries are searched to find the contact person, and the head portraits of the contact person in the different network head portrait libraries are extracted, so as to respond to the request issued by the terminal. Certainly, users of different terminals having the same contact person therein may be unfamiliar to each other, thus, the server can be configured to push head portraits of the requested contact person in all the terminals no matter whether or not the users of the terminals are familiar to each other, or configured to determine the users who know the user of the terminal issuing the request among the users of the terminals each having the head portrait of the requested contact person therein, and only push the head portraits of the requested contact person in the terminals of the determined users (specifically, for the terminal A and the terminal B, if the address book of the terminal A has the contact information of the user of the terminal B or if the address book of the terminal B has the contact information of the user of the terminal A, or if the address book of the terminal A has the contact information of the user of the terminal B and the address book of the terminal B has the contact information of the user of the terminal A, the users of the terminal A and the terminal B are determined to be familiar to each other). By acquiring more head portrait information of the same contact person, the selectivity of the user increases.

In the technical solution, preferably, the processing method further includes establishing an association between each head portrait of the designated contact person in the designated interface and the source program corresponding to the head portrait, and displaying messages generated by the source program corresponding to the designated head portrait of the designated contact person in the designated interface or switching to a function interface provided by the source program corresponding to the designated head portrait directly according to a received selection operation exerted on the designated head portrait.

In the technical solution, by associating each head portrait of the designated contact person with an application program, through a contact person interface of a certain application program, messages generated by other application programs can be looked up directly and in time via the head portrait of the designated contact person. For example, beside the head portrait, a bubble box for displaying QQ chat messages of a user or update information of micro blog is displayed, or various application programs can be switched via the head portraits of the contact person, thereby facilitating the user to perform an operation.

The above illustrates the technical solution of the present invention in detail in combination with the accompanying drawings. In view of that when the user uses an address book of a mobile phone or uses a social application program, only images in the local album can be set to be head portraits of contact persons, or only the head portraits used by the current application can be looked up and the head portraits used by other applications cannot be looked up. Furthermore, the head portraits of contact persons in various social application programs installed in the mobile phone cannot be set to be associated with the head portraits of the contact persons in the address book, and to a great extend selectivity and manipulability cannot satisfy user's needs. Therefore, the present invention provides a technical solution. By means of the technical solution, when the user performs an operation to set the head portrait of a designated contact person in the address book or in an application program, the head portraits of the contact person in the application programs and the address book can be collected and displayed for the user to make a selection, thereby increasing user's selectivity and improving user's experience.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A terminal comprising:
a processor comprising hardware configured to:
determine at least one associated application program corresponding to a designated contact person in an address book of the terminal;

for each of the determined at least one associated application program, obtain a head portrait associated with a respective application program;

simultaneously display on a display of the terminal each head portrait associated with the respective application program for the designated contact person along with an address book head portrait;

wherein a network head portrait database corresponding to the terminal is established in a designated server, and when at least one contact person and the head portrait of the at least one contact person in an address book of a terminal of at least one other contact person are stored in a related manner in the network head portrait database and the at least one other contact person is the contact person in the address book of the terminal of the at least one contact person, the processor comprising hardware is configured to acquire the head portraits of the designated contact person from the network head portrait database, and wherein the processor comprising hardware is further configured to transmit a request for acquiring head portraits to the designated server, so as to acquire the head portraits of the designated contact person from at least one other terminal's network head portrait database in the designated server and add the acquired head portraits to the network head portrait database corresponding to the terminal of the designated contact person, the at least one other terminal is the terminal of at least one contact person who is the contact person in the address book of the terminal of the designated contact person or the at least one associated application program and wherein the acquired head portraits are displayed.

2. The terminal of claim 1, wherein the processor comprising hardware determines the respective application program as one associated application program of the designated contact person when an application program comprises contact person information which matches information of the designated contact person, or when the information of the designated contact person comprises account information of the respective application program.

3. The terminal of claim 1, wherein the simultaneous display is when the address book is displayed or a designated interface is provided by the respective application program for display, and wherein the designated interface is a head portrait setting interface or a head portrait look-up interface provided by the application program corresponding to the designated interface.

4. The terminal of claim 3, wherein the processor comprising hardware is further configured to receive a selection of a head portrait among the display head portraits and to set the selected head portrait to be the head portrait of the designated contact person in the application program corresponding to the designated interface, or to be the head portraits of the designated contact person in the address book and in all of the respective application programs associated with the designated contact person.

5. The terminal of claim 1, further comprising a storage storing a local head portrait database, the local head portrait database containing the head portraits of the designated contact person for each of the respective application programs stored in a related manner, the processor comprising hardware is further configured to acquire the head portraits from the local head portrait database and display the acquired head portraits.

6. The terminal of claim 5, wherein the processor comprising hardware is configured to obtain head portraits for the designated contact person by a method selected from a group consisting of acquiring a head portrait from a remote server for a respective application program and retrieve a head portrait from a local cache file for a respective application program.

7. The terminal of claim 6, wherein the processor comprising hardware executes facial recognition on images in local cache files to obtain the head portrait associated with a respective application program for the designated contact person.

8. The terminal of claim 1, wherein the processor comprising hardware is further configured to upload at least one contact person and the head portrait set for the at least one contact person in the address book to the network head portrait database in a related manner.

9. The terminal of claim 1, wherein the processor comprising hardware is configured to display an indicator indicative of messages generated by the respective application program superimposed on a corresponding head portrait for the respective application.

10. The terminal of claim 9, wherein the processor comprising hardware switches to an interface for the respective application program corresponding to the head portrait having the indicator superimposed thereon when the indicator is selected.

11. The terminal of claim 9, wherein the processor comprising hardware switches to an interface for the respective application program corresponding to the head portrait when the head portrait is selected.

12. A processing method for head portraits of a contact person, comprising:

determining at least one associated application program corresponding to a designated contact person in an address book of the terminal; and setting the head portrait of the designated contact person in the address book to be the head portrait of the designated contact person in the at least one associated application program, or setting the head portrait of the designated contact person in the at least one associated application program to be the head portrait of the designated contact person in the address book, if the head portraits of the designated contact person in the address book and in a designated interface of the at least one associated application program are different, wherein the method further comprises displaying the head portrait of the designated contact person in an address book of a terminal of at least one other contact person in the designated interface, the at least one other contact person is the contact person in the address book of the terminal of the designated contact person or the at least one associated application program, wherein a network head portrait database corresponding to the terminal is established in a designated server, and when at least one contact person and the head portrait of the at least one contact person in an address book of a terminal of at least one other contact person are stored in a related manner in the network head portrait database and the at least one other contact person is the contact person in the address book of the terminal of the at least one contact person or the at least one associated application program, the processing method further comprises acquiring the head portraits of the designated contact person from the network head portrait database when the head portraits of the designated contact person in the designated interface need to be displayed, and displaying the acquired head portraits.

* * * * *